United States Patent
Cho

(10) Patent No.: US 9,319,233 B2
(45) Date of Patent: Apr. 19, 2016

(54) METHOD AND SYSTEM FOR CONTROLLING NETWORK DEVICE AND RECORDING MEDIUM STORING PROGRAM FOR EXECUTING THE METHOD

(75) Inventor: Jung-Yon Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 798 days.

(21) Appl. No.: 12/278,167

(22) PCT Filed: Nov. 7, 2006

(86) PCT No.: PCT/KR2006/004623
§ 371 (c)(1),
(2), (4) Date: Aug. 4, 2008

(87) PCT Pub. No.: WO2007/089066
PCT Pub. Date: Aug. 9, 2007

(65) Prior Publication Data
US 2009/0178040 A1     Jul. 9, 2009

(30) Foreign Application Priority Data
Feb. 2, 2006   (KR) .................. 10 2006 0010052

(51) Int. Cl.
*G06F 15/16*   (2006.01)
*H04L 12/28*   (2006.01)
(Continued)

(52) U.S. Cl.
CPC ............ *H04L 12/2803* (2013.01); *G06F 9/542* (2013.01); *H04L 12/282* (2013.01); *H04L 67/40* (2013.01); *G06F 2209/544* (2013.01); *H04L 12/2809* (2013.01); *H04L 12/2812* (2013.01)

(58) Field of Classification Search
CPC ................ H04L 12/2809; H04L 12/2812
USPC .......................... 709/201–203, 230
See application file for complete search history.

(56) References Cited

U.S. PATENT DOCUMENTS 4,809,170 A * 2/1989 Leblang .............. G06F 8/71
707/999.202
5,748,930 A 5/1998 Prakash
(Continued)

FOREIGN PATENT DOCUMENTS

| KR | 2002-0039752 A | 5/2002 |
| KR | 1020040066550 A | 7/2004 |

OTHER PUBLICATIONS

Communication dated Feb. 11, 2014, issued by the European Patent Office in counterpart European Application No. 06812459.3.
(Continued)

*Primary Examiner* — Hieu Hoang
(74) *Attorney, Agent, or Firm* — Sughrue Mion, PLLC

(57) ABSTRACT

A task-based device control method and system for easily providing a service desired by a user in a home network using universal plug and play (UPnP), and a recording medium storing a program for executing the method are provided. The method includes, if a service is selected using a first device connected to the network, the first device generating a task according to the service; the first device notifying another device of the generation of the task via the network; if the first device receives a command to browse or search for the task from a second device via the network, the first device transmitting information on the task to the second device; and if the first device receives a request to fetch the task from the second device via the network, the first device transferring the task to the second device.

19 Claims, 15 Drawing Sheets

(51) Int. Cl.
*G06F 9/54* (2006.01)
*H04L 29/06* (2006.01)

(56) References Cited

U.S. PATENT DOCUMENTS

| | | | |
|---|---|---|---|
| 6,101,481 A | 8/2000 | Miller | |
| 6,112,225 A * | 8/2000 | Kraft | G06F 9/5072 709/201 |
| 6,173,306 B1 * | 1/2001 | Raz | G06F 9/5083 718/102 |
| 6,233,611 B1 | 5/2001 | Ludtke et al. | |
| 6,330,583 B1 * | 12/2001 | Reiffin | G06F 9/5072 710/261 |
| 6,711,616 B1 * | 3/2004 | Stamm | H04L 67/42 709/223 |
| 6,938,048 B1 | 8/2005 | Jilk et al. | |
| 2003/0120700 A1 * | 6/2003 | Boudnik | G06F 11/3688 718/102 |
| 2003/0137693 A1 * | 7/2003 | Nishio | 358/1.15 |
| 2003/0208691 A1 * | 11/2003 | Smart et al. | 713/201 |
| 2004/0148326 A1 * | 7/2004 | Nadgir et al. | 709/200 |
| 2005/0068571 A1 * | 3/2005 | Hart | H04N 1/00283 358/1.15 |
| 2006/0168334 A1 * | 7/2006 | Potti et al. | 709/239 |
| 2006/0184941 A1 * | 8/2006 | Urhan | G06F 9/4843 718/100 |
| 2007/0088675 A1 * | 4/2007 | Duncan | 707/2 |
| 2007/0124363 A1 * | 5/2007 | Lurie | G06F 9/5072 709/202 |
| 2008/0027953 A1 * | 1/2008 | Morita et al. | 707/100 |

OTHER PUBLICATIONS

Communication dated Jun. 21, 2013 issued by the European Patent Office in counterpart European Application No. 06812459.3.

* cited by examiner

FIG. 5

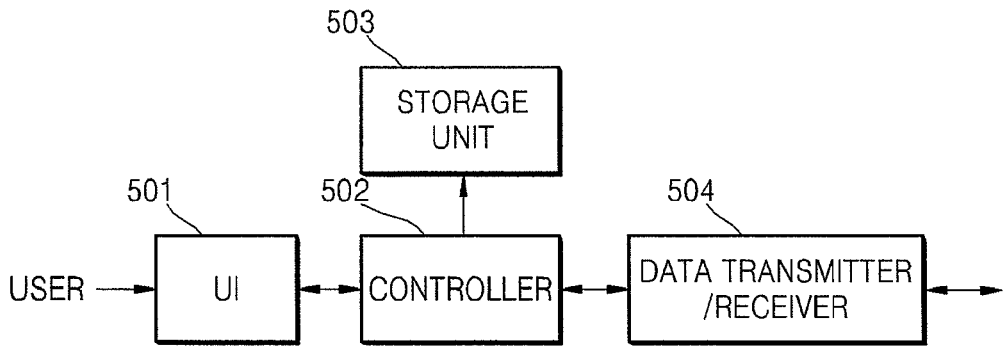

FIG. 6

```
<Task>
    <TaskName>uuid of this Task</TaskName>
    <TaskCreator>uuid of Device Generating Task</TaskCreator>
    <SubTASK>
            <order>1</order>
            <action>Display</action>
            <SourceContentURL>URL of Source Content</SourceContentURL>
            <targetdevice>uuid of the Second Device </targetdevice>
            <state>READY</state>
    </SubTask>
</Task>
```

FIG. 7

```
<Task>
    <TaskName>uuid of this Task</TaskName>
    <TaskCreator>uuid of Device Generating Task</TaskCreator>
    <SubTASK>
    <order>1</order>
   <action>encoding</action>
    <SourceContentURL>URL of Source Content</SourceContentURL>
    <TargetFormat>DLNA.ORG_PN = MP3</TargetFormat>
    <state>READY</state>
    <OutputContentURL></OutoutContentURL>
     </SubTASK>
     <SubTASK>
    <order>2</order>
     <action> store </action>
    <targetdevice>uuid of target device </targetdevice>
    <state>Wait</state>
    <inputContentURL rule="OutputContentURI@TASK1" ></InputContentURL>
     </SubTASK>
</TASK>
```

FIG. 10A

```
<Task>
  <TaskName>uuid of this Task</TaskName>
  <TaskCreator>uuid of Device Generating Task</TaskCreator>
  <SubTASK>
    <order>1</order>
    <action>encoding</action>
    <SourceContentURL>URL of Source Content</SourceContentURL>
    <TargetFormat>DLNA.ORG_PN = MP3</TargetFormat>
    <state>READY</state>                                    ──1001
    <OutputContentURL></OutoutContentURL>
  </SubTASK>
  <SubTASK>
    <order>2</order>
    <action> store </action>
    <targetdevice>uuid of target device </targetdevice>
    <state>Wait</state>
    <inputContentURL rule="OutputContentURI@TASK1" ></InputContentURL>
  </SubTASK>
</Task>
```

FIG. 10B

```
<Task>
    <TaskName>uuid of this Task</TaskName>
    <TaskCreator>uuid of Device Generating Task</TaskCreator>
    <SubTASK>
        <order>1</order>
        <action>encoding</action>
        <SourceContentURL>URL of Source Content</SourceContentURL>
        <TargetFormat>DLNA.ORG_PN = MP3</TargetFormat>
        <state>DONE</state>                                                    ──1002
        <OutputContentURL>Content URL AA</OutoutContentURL>
    </SubTASK>
    <SubTASK>
        <order>2</order>
        <action> store </action>
        <targetdevice>uuid of target device </targetdevice>
        <state>READY</state>                                                   ──1003
        <inputContentURL rule="OutputContentURL@TASK1" >Content URL AA</InputContentURL>
    </SubTASK>
</Task>
```

FIG. 10C

```
<Task>
  <TaskName>uuid of this Task</TaskName>
  <TaskCreator>uuid of Device Generating Task</TaskCreator>
  <SubTASK>
    <order>1</order>
    <action>encoding</action>
    <SourceContentURL>URL of Source Content</SourceContentURL>
    <TargetFormat>DLNA.ORG_PN = MP3</TargetFormat>
    <state>DONE</state>
    <OutputContentURL>Content URL AA</OutoutContentURL>
  </SubTASK>
  <SubTASK>
    <order>2</order>
    <action> store </action>
    <targetdevice>uuid of target device </targetdevice>
    <state>DONE</state>                                          ──1004
    <inputContentURL rule="OutputContentURI@TASK1" >Content URL AA</InputContentURL>
  </SubTASK>
</Task>
```

METHOD AND SYSTEM FOR CONTROLLING NETWORK DEVICE AND RECORDING MEDIUM STORING PROGRAM FOR EXECUTING THE METHOD

BACKGROUND OF THE INVENTION

This application is a National Stage of International Application No. PCT/KR2006/004623 filed Nov. 7, 2006 and claims priority Korean Patent Application No. 10-2006-0010052 filed on Feb. 2, 2006, in the Korean Intellectual Property Office, the disclosure of which is incorporated herein in its entirety by reference.

1. Field of the Invention

The present invention relates to the controlling of a network device, and more particularly, to a method and apparatus for controlling a device to provide a service desired by a user in a home network using universal plug and play (UPnp) and a recording medium storing a program for executing the method.

2. Description of the Related Art

Remote procedure call (RPC)-based device control methods are used to provide a service desired by a user in a home network using universal plug and play (UPnP). Devices connected to the home network are classified into control points and Controlled devices in the RPC-based device control methods. In these methods, a control point is operated to transmit a previously defined command to a Controlled device according to a service request of the user.

FIG. 1 illustrates a conventional RPC-based device control method. Referring to FIG. 1, when a device performs a user's service request, a control point 100 transmits a control command regarding a user's service from among a set of previously defined commands to a Controlled device 110 according to the user's service request. The control point 100 can be defined as a controller or a control device.

FIG. 2 illustrates another conventional RPC-based device control method. Referring to FIG. 2, when three devices sequentially perform the user's service request, a control point 200 sequentially transmits control first, second, and third control commands to a first, second, and third Controlled devices 210, 220, and 230 at a proper time. The control point 200 must monitor the operation of the first, second, and third Controlled devices 210, 220, and 230. The first Controlled device 210 performs an operation according to the first control command (1a), and transmits a first result obtained by performing the operation to the second Controlled device 220 (1b). The second Controlled device 220 performs an operation according to the second control command (2a), and transmits a second result obtained by performing the operation to the third Controlled device 230 (2b). The third Controlled device 230 performs an operation according to the third control command (3a).

FIG. 3 illustrates another conventional RPC-based device control method. Referring to FIG. 3, when a device reproduces contents stored in another device, a control point 300 transmits a contents browse request message to a fourth Controlled device 310 (1). The control point 300 receives a contents list from the fourth Controlled device 310 as contents browse result information (2) and provides the contents list to the user. If the user selects contents from the contents list, the control point 300 transmits a reproduction request message for the selected contents to a fifth Controlled device 320 (3). The fifth Controlled device 320 reproduces data of the contents received from the fourth Controlled device 310 based on information included in the reproduction request message (4 and 5).

Therefore, in the conventional RPC-based device control methods, a control point and Controlled devices are clearly classified, the control point knows information on the Controlled devices in advance, the Controlled devices are connected to a network to be controlled by the control point, and it is sure that the control point is connected to the network.

However, the Controlled devices that perform a service desired by a user in a home network cannot be connected to the home network to be controlled by the control point since the Controlled devices cannot be always powered on or be connected to the network like a mobile device. Therefore, the Controlled devices must be connected to the network and set to be controlled by the control point so that the user can require the control point to send a desired service. If the control point is not connected to the network, the user cannot require the control point to send the desired service.

Also, when a service desired by the user is provided by interacting with a plurality of Controlled devices as illustrated in FIG. 2, a control point can monitor results obtained by performing operations of the plurality of devices so that the control point can transmit control commands to each of the Controlled devices in due course as described with reference to FIG. 2.

However, it is difficult for a control point to monitor operations of the plurality of Controlled devices. In particular, when the Controlled devices are different from each other, the control point must control all the Controlled devices, and thus it is more difficult to monitor the results obtained by performing the operations of the Controlled devices. To address this problem, a plurality of control points is used to control the plurality of Controlled devices. However, it is difficult for users to use such a method.

SUMMARY OF THE INVENTION

The present invention provides a task-based device control method and system for easily providing a service desired by a user in a home network using universal plug and play (UPnP), and a recording medium storing a program for executing the method.

The present invention also provides a task-based device control method and system for easily providing a service desired by a user in a home network using UPnP without classifying a control point and Controlled devices, and a recording medium storing a program for executing the method.

The present invention also provides a task-based device control method and system for to easily providing a service desired by a user using a device having a user interface (UI) function in a home network using UPnP, and a recording medium storing a program for executing the method.

The present invention also provides a task-based device control method and system for providing a service desired by a user at an availability point-in-time of a device used to provide the service in a home network using UPnP, and a recording medium storing a program for executing the method.

The present invention also provides a method and system for controlling a task-based device in a home network using UPnP to provide a service desired by a user without monitoring a device used to provide the service, and a recording medium storing a program for executing the method.

According to the present invention, a device having a UI function in a home network using UPnP is used to generate a task according to a service desired by a user, and devices used to provide the service to the user voluntarily perform the task, thereby easily providing the service to the user without classifying a control point and controlled devices in the home network and monitoring the devices performing the task.

Also, the devices voluntarily perform the task, thereby providing the service to the user without control information on the devices.

Also, the service can be provided to the user at an available time of the devices which are not connected to the home network or are in a non-operative state when the task is generated according to a user's service request, so that it is not necessary for the user to further request the service at the availability point-in-time of the devices.

Moreover, the device having the UI function is used to generate the task according to the service desired by the user and provide the service without classifying the control point and the Controlled devices, thereby providing the service to the user even if the control point is not connected to the home network.

According to an aspect of the present invention, there is provided a device control method for providing a service desired by a user in a network, the method comprising: if the user selects the service using a first device connected to the network, the first device generating a task according to the selected service; the first device notifying the generation of the task of another device via the network; if the first device receives a command to browse or search for the task via the network, the first device transmitting information on the task to a second device that sent the command to browse or search for the task; and if the second device requires fetching the task via the network, the first device transferring the task to the second device.

According to another aspect of the present invention, there is provided a device control method for providing a service desired by a user in a network, the method comprising: if a first device connected to the network notifies a second device connected to the network of the generation of a task, the second device sending a command to browse or search for the task to the first device; if the first device sends information on the task to the second device, the second device checking if the task is to be performed by the second device based on the information on the task; if the task is to be performed by the second device, the second device requiring the first device to fetch the task; and if the first device transfers the task to the second device, the second device performing the task.

According to another aspect of the present invention, there is provided a device control method for providing a service desired by a user in a network, the method comprising: if a second device is connected to the network or is in an active state, the second device sending a command to browse or search for a task to another device connected to the network; if the second device receives information on the task from a first device via the network, the second device that sent the command to browse or search for the task checking if the task is to be performed by the second device based on the information on the task; if the task is to be performed by the second device, the second device requiring the first device to fetch the task; and if the first device transfers the task to the second device, the second device performing the task.

According to another aspect of the present invention, there is provided a device control system for providing a service desired by a user in a network including a task generating device and a task performing device, the system comprising: a UI interfacing the user and the task generating device; a storage unit storing information on a task; a data transmitter/receiver transmitting/receiving data via the network; and a controller, if the user selects the service via the UI, generating the task for the selected service, storing the task in the storage unit, and sending information on the task via the data transmitter/receiver.

According to another aspect of the present invention, there is provided a device control system for providing a service desired by a user in a network including a task generating device and a task performing device, the system comprising: a data transmitter/receiver transmitting/receiving data via the network; and a controller, if the controller receives a notice of the generation of a task from the data transmitter/receiver, transmitting a command to browse or search for the task to the data transmitter/receiver, receiving information on the task from the data transmitter/receiver, and, if the task is to be performed by the controller, performing the task.

According to another aspect of the present invention, there is provided a device control system for providing a service desired by a user in a network including a task generating device and a task performing device, the system comprising: a data transmitter/receiver transmitting/receiving data via the network; and a controller, if the controller is connected to the network or is in an active state, transmitting a command to browse or search for the task to the data transmitter/receiver, receiving information on the task from the data transmitter/receiver, and, if the task is to be performed by the controller, performing the task.

According to another aspect of the present invention, there is provided a computer readable recording medium having embodied thereon a computer program for executing a device control method for providing a service desired by a user in a network including a task generating device and a task performing device, the recording medium comprising: if the user selects the service using a first device connected to the network, a code generating a task according to the selected service using the first device; a code notifying the generation of the task of another device via the network using the first device; if the first device receives a command to browse or search for the task via the network, a code transmitting information on the task to a second device that sent the command to browse or search for the task using the first device; and if the second device requires fetching the task via the network, a code transferring the task to the second device using the first device.

BRIEF DESCRIPTION OF THE DRAWINGS

The above and other aspects and advantages of the present invention will become more apparent by describing in detail exemplary embodiments thereof with reference to the attached drawings in which:

FIG. 5 is a block diagram of a task generating device or a task generating and performing device;

FIG. 6 illustrates a task generated according to an embodiment of the present invention;

FIG. 7 illustrates a task generated according to another embodiment of the present invention;

FIGS. 10A, 10B, and 10C illustrate updates of the task illustrated in FIG. 7;

DETAILED DESCRIPTION OF THE INVENTION

The present invention will now be described more fully with reference to the accompanying drawings.

Figure 1:
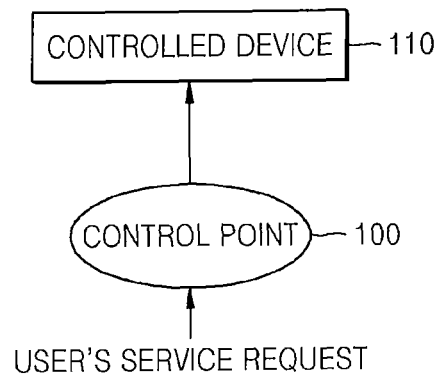
FIG. 1 illustrates a conventional remote procedure call (RPC)-based device control method.
Figure 2:
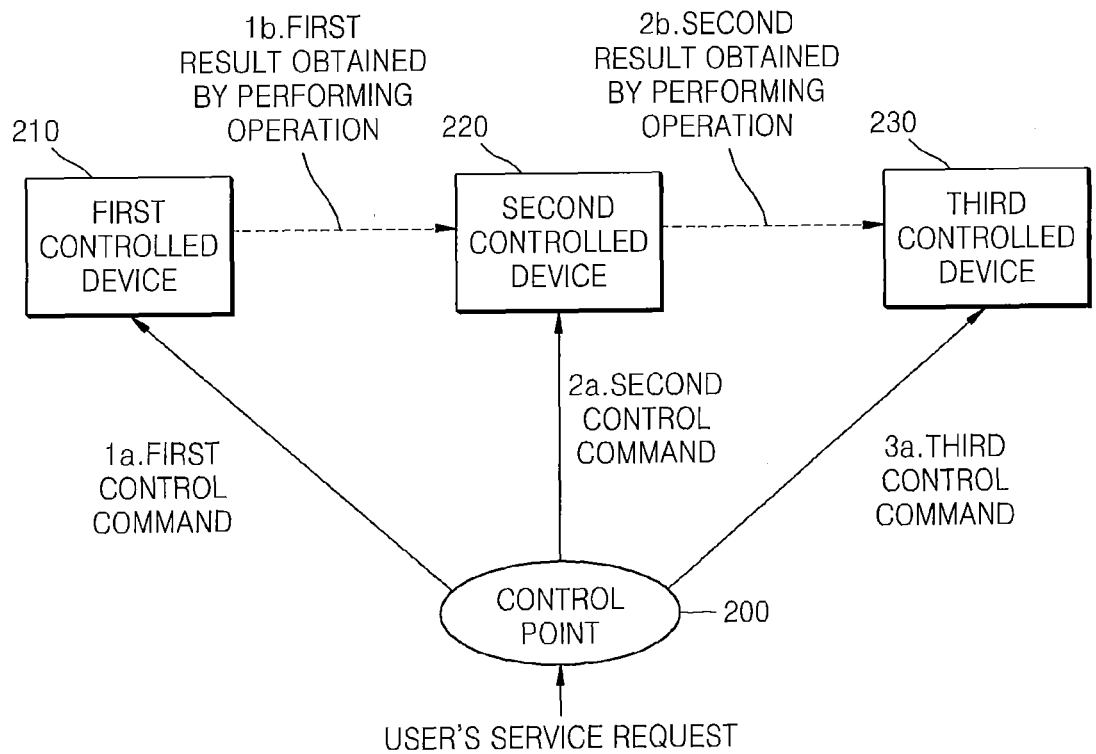
FIG. 2 illustrates another conventional RPC-based device control method.
Figure 3:
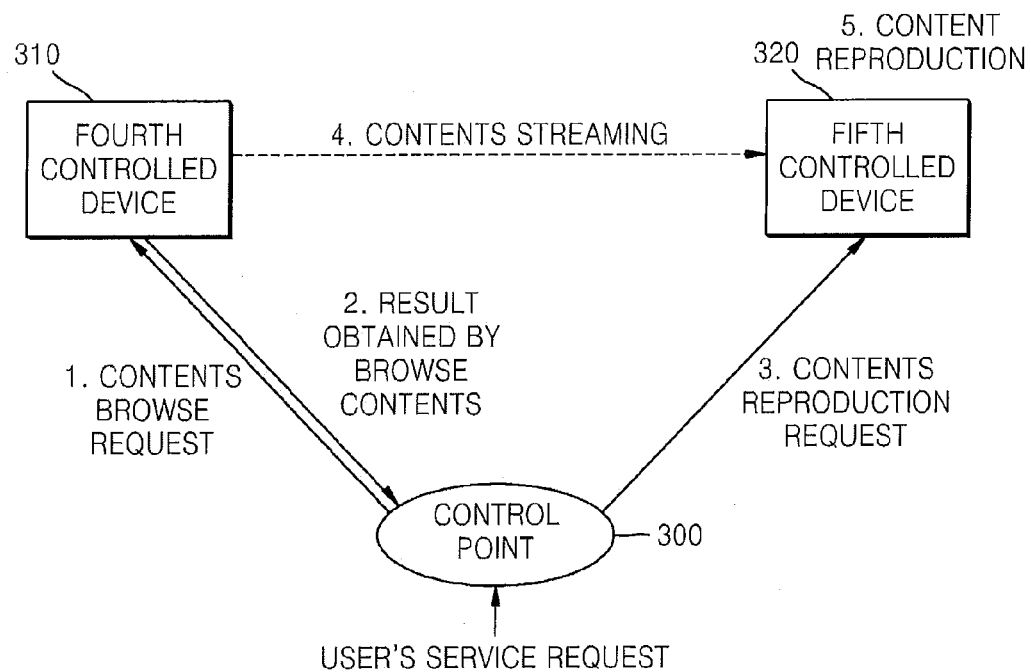
FIG. 3 illustrates another conventional RPC-based device control method.
Figure 4:
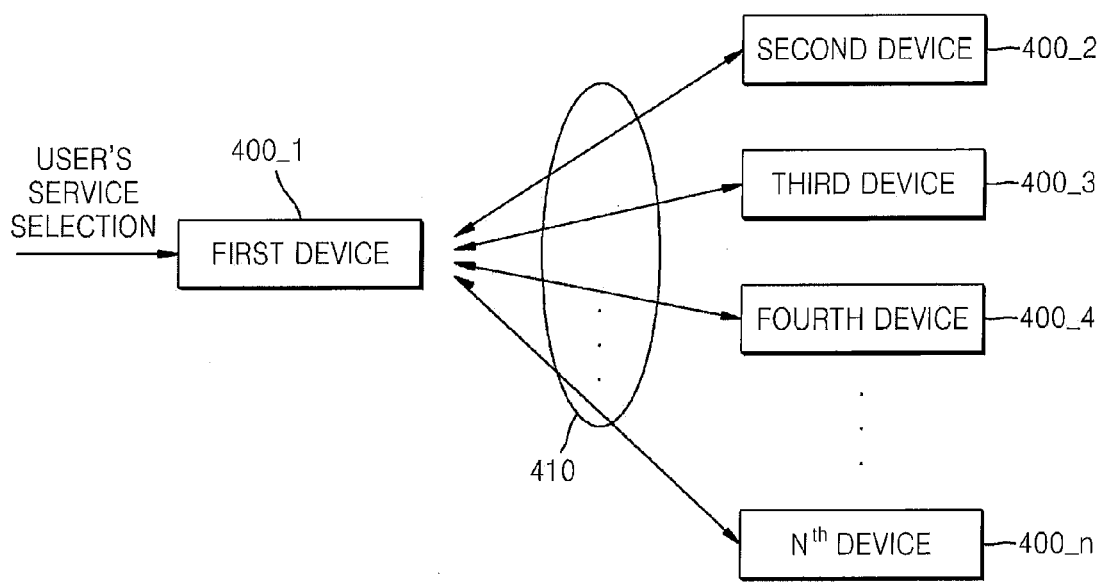
FIG. 4 is a block diagram of a device control system in a network according to an embodiment of the present invention.

FIG. 4 is a block diagram of a device control system in a network 410 according to an embodiment of the present invention. Referring to FIG. 4, the device control system comprises first through $n^{th}$ devices 400_1~400_n and a network 410.

The first through $n^{th}$ devices 400_1~400_n can be task generating devices, task performing devices, or task generating and performing devices according to the present invention. The first device 400_1 is a task generating device, or a task generating and performing device. The second through $n^{th}$ devices 400_2~400_n are task performing devices.

If the first device 400_1 that is the task generating device, or the task generating and performing device, can be constituted as illustrated in FIG. 5. Referring to FIG. 5, the first device 400_1 comprises a user interface (UI) 501, a controller 502, a storage unit 503, and a data transmitter/receiver 504.

The UI 501 allows a user to access the first device 400_1. In detail, the UI 501 provides service information selectable by the user to the user based on information provided by the controller 502. If the user selects a service based on the service information, the UI 501 transmits information on the service selected by the user to the controller 502.

The controller 502 generates a task for the selected service, stores the task in the storage unit 503, and sends information on the task via the data transmitter/receiver 504.

That is, the controller 502 receives the service information selected by the user from the UI 501 and generates the task based on the service selected by the user. The task can include a subtask through a plurality of subtasks according to the number of actions necessary for performing the service selected by the user.

FIG. 6 illustrates a task generated according to an embodiment of the present invention. Referring to FIG. 6, since an action is necessary for performing a service, the task includes a subtask. The task is generated when a user selects the service that reproduces some contents from a specific TV. The controller 502 can generate the task described in the form of an extensible markup language (XML).

The task can include information on an action to be performed according to a service, a device performing the task, contents or information on the device, guidelines for processing a result obtained by performing an operation, etc. Also, the task can include information on a unique ID of the task, a device firstly generating the task, a state of performing the task, etc. to manage the task.

FIG. 7 illustrates a task generated according to another embodiment of the present invention. Referring to FIG. 7, since two actions are necessary for performing a service, the task includes two subtasks. The task is generates when the user selects the service that encodes designated contents in another format and stores the encoded contents.

The controller 502 stores the task in the storage unit 503 and transmits a message notifying the generation of the task via the data transmitter/receiver 504.

After transmitting the message notifying the generation of the task, if the data transmitter/receiver 504 sends a command to browse or search for information on the task or requires fetching the information on the task to the controller 502, the controller 502 transmits the information on the task to the data transmitter/receiver 504, which is defined as transfer of the task from a task generating device to a task fetch requesting device.

If the data transmitter/receiver 504 sends a result obtained by performing the task to the controller 502, the controller 502 outputs the result to the UI 501. Therefore, the user can determine whether the task is performed according to the service selected by the user. However, the controller 502 may not output the result to the UI 501.

The controller 502 can check whether the task is a task to be performed by the controller 502. If it is determined that the task is a task to be performed by the controller 502, the controller 520 performs the task, and updates the information on the task. The controller 502 checks if there is a task to be performed based on the updated information on the task, i.e., the number of subtasks included in the task and the number of a current orders. If there is no task to be performed, the controller 502 ends an operation related to the task.

If the task to be performed exists or the task is not the task performed by the controller 502, the controller 502 transmits the message notifying the generation of the task to the data transmitter/receiver 504.

If the data transmitter/receiver 504 does not send the command to browse or search for the task to the controller 502 for a predetermined period of time after the controller 502 transmits the message, or does not require fetching the information on the task for a predetermined period of time after the controller 502 receives the command to browse or search for information on the task and transmits the information on the task to the data transmitter/receiver 504, the controller 502 recognizes that another device does not send a response via the network 410 and notifies it to the user via the UI 501.

Figure 8:
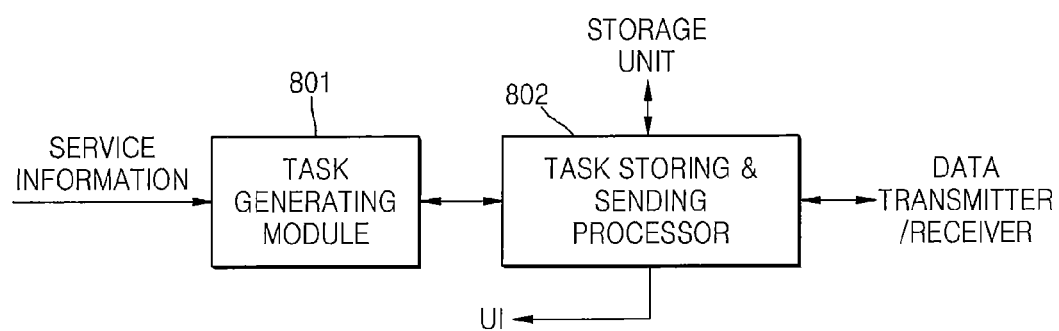
FIG. 8 is a block diagram of a controller illustrated in FIG. 5.

For this, the controller 502 can comprise a task generating module 801 and a task storing & sending processor 802. FIG. 8 is a block diagram of the controller 502 illustrated in FIG. 5. Referring to FIG. 8, if the task generating module 801 receives the service information selected by the user, and generates a task according to the service selected by the user as illustrated in FIG. 6 or 7. The task generating module 801 transfers the task to the task storing & sending processor 802.

Like the controller 502, the task storing and sending processor 802 stores the task in the storage unit 503, transmits the task to the data transmitter/receiver 504, and controls the UI 502 based on the information received from the data transmitter/receiver 504.

The storage unit 503 stores the task generated or updated by the controller 502. The data transmitter/receiver 504 transmits/receives data in the form of a UPnP service between the controller 502 and the network 410.

As described above, a device that is connected to the network 401 and has a UI function can generate the task according to the present invention.

Figure 9:
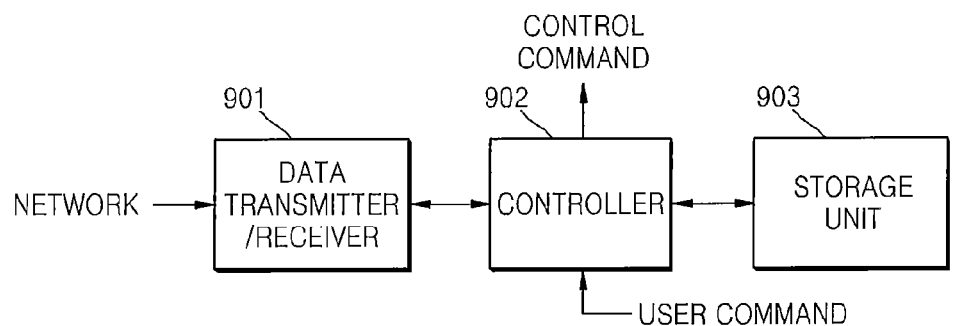
FIG. 9 is a block diagram of a task performing device according to an embodiment of the present invention.

If the second device 400_2 is a task performing device, the second device 400_2 can be constituted as illustrated in FIG. 9. Referring to FIG. 9, the second device 400_2 comprises a data transmitter/receiver 901, a controller 902, and a storage unit 903.

Like the data transmitter/receiver 504 illustrated in FIG. 5, the data transmitter/receiver 901 transmits/receives data in the form of a UPnP service between the controller 902 and the network 410.

The controller 902 receives a task generation notice from the data transmitter/receiver 901, and transmits a command to browse or search for the task to the data transmitter/receiver 901. The command to browse or search for the task is in response to a user command. The controller 902 receives information on the task from the data transmitter/receiver 901, and checks whether the task is a task to be performed by the controller 902 in the same manner as the controller 502. If the controller 902 is to perform the task, the controller 902 requires fetching the task via the data transmitter/receiver 901. If the task is transferred to the controller 902, the controller 902 performs the task.

The controller 902 updates the information on the task and stores the updated information on the task in the storage unit 903.

The controller 902 checks if there is a task to be performed based on the information on the task stored in the storage unit 903 in the same manner as the controller 502. If the task to be performed by the controller 902 exists, the controller 902 transmits a message notifying the generation of the task to the data transmitter/receiver 901.

The controller 902 sends the updated task via the data transmitter/receiver 901 in order of operations performed by the controller 502. In detail, if the data transmitter/receiver 901 sends the command to browse or search for the task to the controller 902, the controller 902 transmits the updated information on the task to a device via the data transmitter/receiver 901. If the data transmitter/receiver 901 requires fetching the task to the controller 902, the controller 902 transfers the updated information on the task to the corresponding device via the data transmitter/receiver 901. The updated information on the task is transferred to the device requiring fetching the task.

FIGS. 10A, 10B, and 10C illustrate updates of the task illustrated in FIG. 7. Referring to FIGS. 10A, 10B, and 10C, two devices perform the task. FIG. 10A shows an initial state of the task in which 1001 indicates that a first subtask is in a ready state, and an element of OutputContentURL is empty.

If the first subtask is performed, information on the task of FIG. 10A is updated as illustrated in FIG. 10B. Referring to FIG. 10B, 1002 indicates that the first subtask is set as done, the element of OutputContentURL is filled with content URL AA. 1003 indicates that a second subtask is in the ready state, and an element of InputContentURL is filled with a value obtained by performing the first subtask.

If the second subtask is completely performed, information on the task of FIG. 10B is updated as illustrated in FIG. 10C. Referring to FIG. 10C, 1004 indicates that the second subtask is set as done.

The first and second subtasks can be performed in a device or different devices. For example, if the first subtask is performed in the second device 400_2, and the second subtask is performed in the third device 400_3, the updated information on the task illustrated in FIG. 10B is transmitted from the second device 400_2 to the third device 400_3.

However, when the first device 400_1 generates the task, if the second device 400_2 is not connected to the network 410 or is in an idle state while being connected to the network 410, the second device 400_2 cannot receive the task generation notice.

If the second device 400_2 is connected to the network 410 and is in an active state while not receiving the task generation notice due to the above reasons, the controller 902 transmits the command to browse or search for the task to the data transmitter/receiver 901, receives the information on the task from the data transmitter/receiver 901, and checks if the task is a task to be performed by the controller 902. If the task is the task to be performed by the controller 902, the first device 400_1 transfers the task to the controller 902 and the controller 902 performs the task. The controller 902 updates the information on the task and checks if there is a task to be performed by the controller 902 in the same manner as described above.

Figure 11:
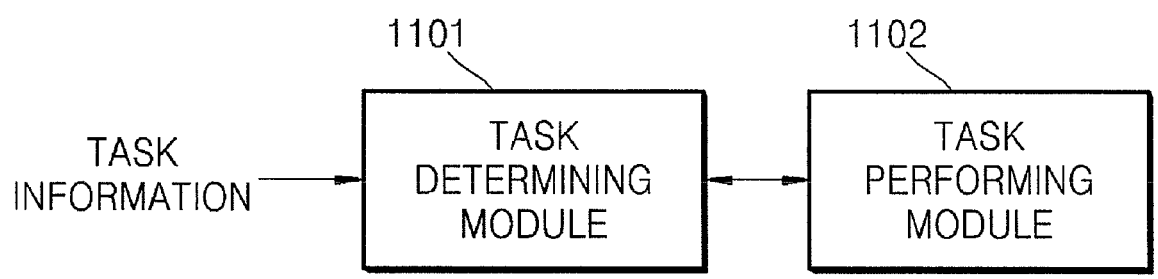
FIG. 11 is a block diagram of a controller illustrated in FIG. 9.

FIG. 11 is a block diagram of the controller 902 illustrated in FIG. 9. Referring to FIG. 11, the controller 902 comprises a task determining module 1101 and a task performing module 1102.

The task determining module 1101 determines if a task received based on the information on the task from the data transmitter/receiver 901 can be performed by the second device 400_2 (or corresponding device). The information on the task is described with reference to FIG. 6 or 7.

If the task can be performed by the second device 400_2, the task performing module 1102 performs the task transferred from the first device 400_1 as described in the controller 902 illustrated in FIG. 9. If the information on the task is updated, the task performing module 1102 stores the updated information on the task in the storage unit 903. If there is a task to be performed by the task performing module 1102, the task performing module 1102 transmits the updated information on the task via the data transmitter/receiver 901. If it is necessary to control the second device 400_2 for performing the task, the task performing module 1102 outputs a control command for controlling a function of the second device 400_2 so that a specific function of the second device 400_2 can be executed.

The task performing device can fetch the information on the task and perform the task when the task performing device is connected to the network 410 and is in an operative state. However, if the task performing device is not connected to the network 410 or is in an idle state while being connected to the network 410, the task performing device can fetch the information on the task and perform the task at an availability point-in-time thereof.

The network 410 is the home network using UPnP. Therefore, the information on the task can be transmitted/received among the first and $n^{th}$ devices 400_1~400_n in the form of the UPnP service.

Figure 12:
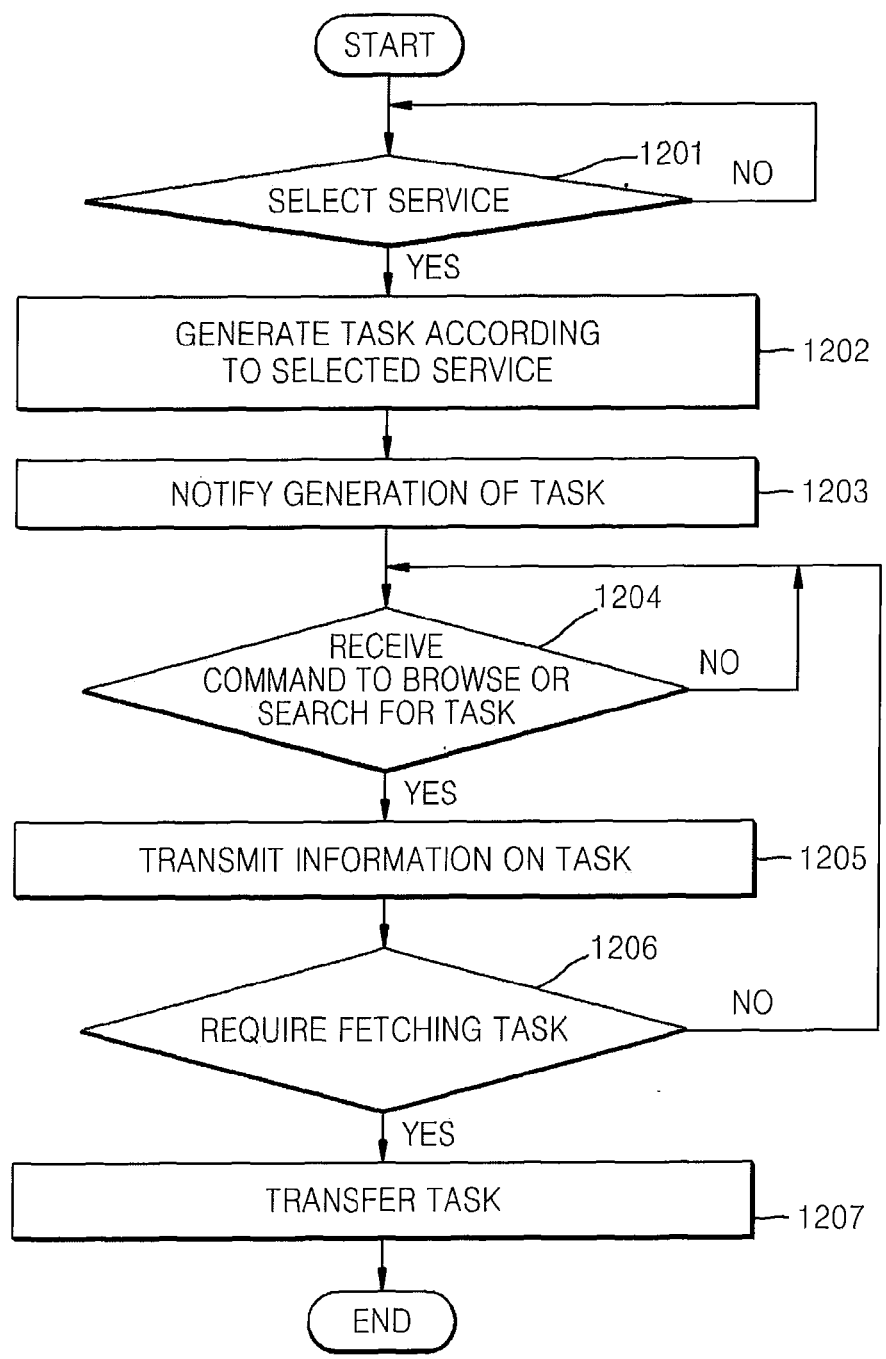
FIG. 12 is a flowchart of generating a task using a device control method in a network according to an embodiment of the present invention.

FIG. 12 is a flowchart of generating a task using a device control method in a network according to an embodiment of the present invention. The flowchart will now be described with reference to FIG. 4. Suppose that the first device 400_1 is a task generating device, and the second device 400_2 is a task performing device.

A user selects a service using the first device 400_1 that has a UI function among devices connected to the network 410 (Operation 1201), and the first device 400_1 generates the task according to the service (Operation 1202).

The first device 400_1 notifies another device of the generation of the task via the network 410 (Operation 1203). The first device 400_1 receives a command to browse or search for the task via the network 410 (Operation 1204), and transmits information on the task to the second device 400_2 that sent the command to browse or search for the task (Operation 1205).

The first device 400_1 receives a request to fetch the task from the second device 400_2 via the network 410 (Operation 1206), and transfers the task to the second device 400_2 (Operation 1207).

Figure 13:
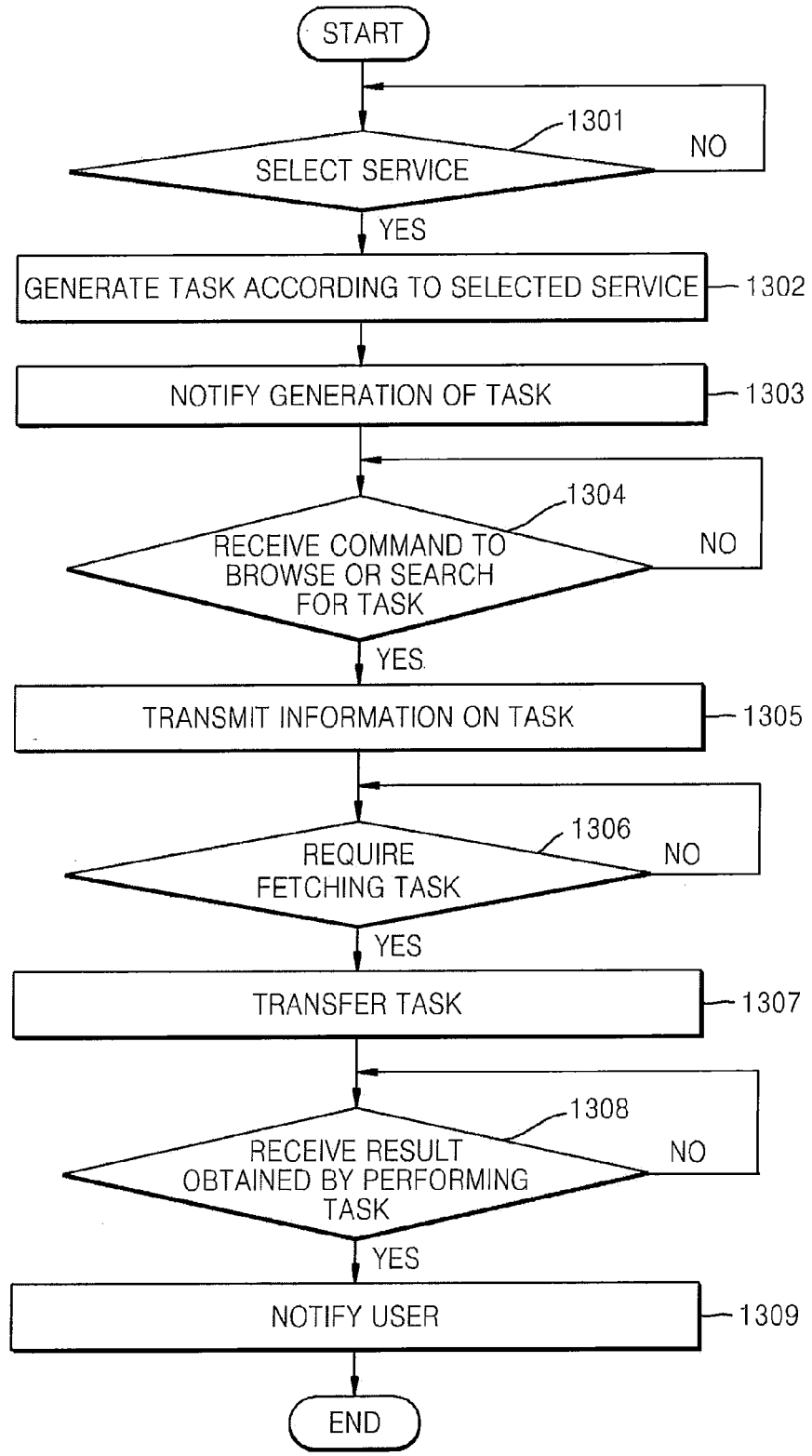
FIG. 13 is a flowchart of generating a task using a device control method in a network according to another embodiment of the present invention.

FIG. 13 is a flowchart of generating a task using a device control method in a network according to another embodiment of the present invention. Operations 1301 through 1307 illustrated in FIG. 13 are the same as Operations 1201 through 1207 illustrated in FIG. 12.

After the first device 400_1 transfers the task to the second device 400_2 (Operation 1307), the first device 400_1 receives a result obtained by performing the task from the second device 400_2 via the network 410 (Operation 1308), and notifies a user of the result (Operation 1309).

Figure 14:
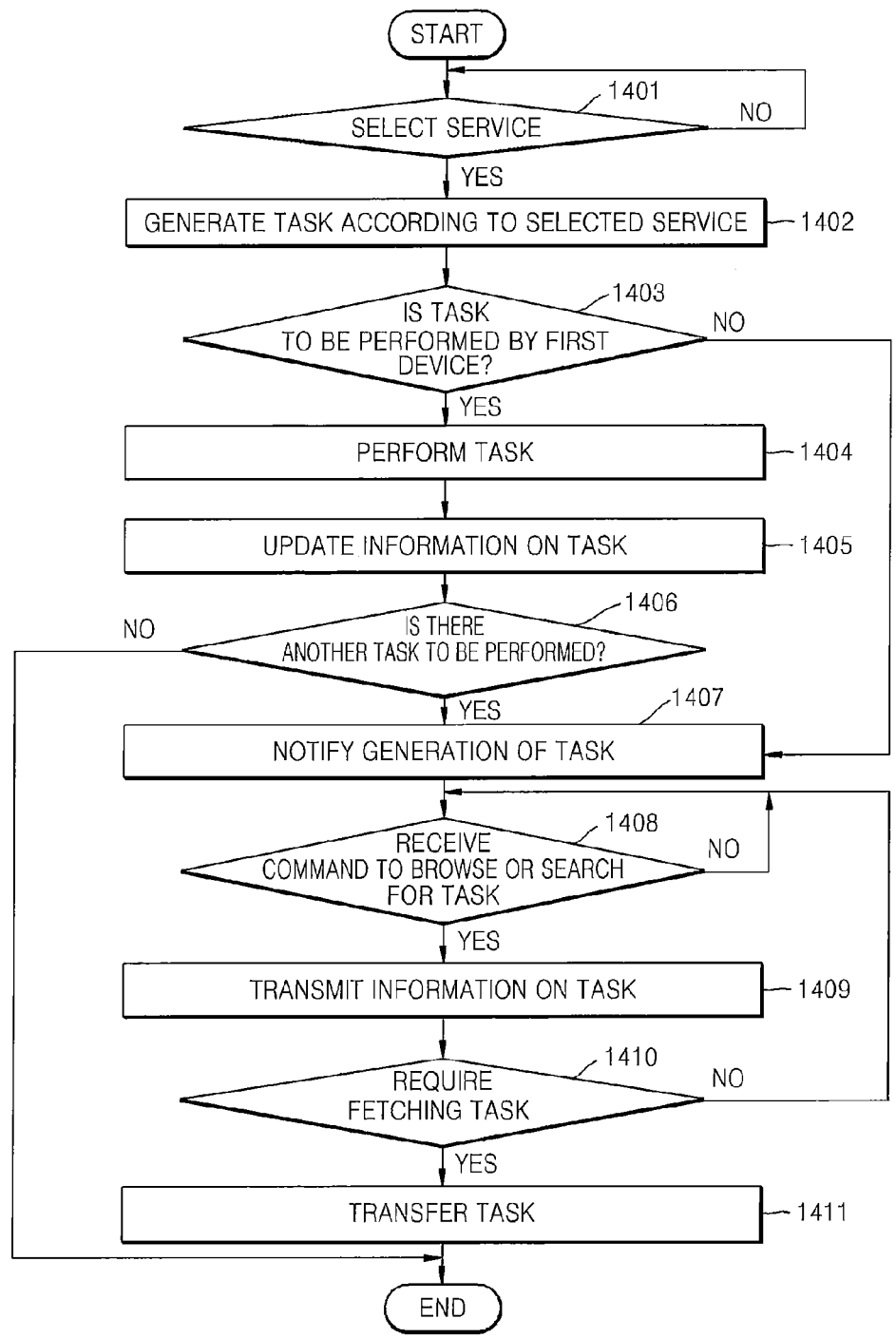
FIG. 14 is a flowchart of generating a task using a device control method in a network according to another embodiment of the present invention.

FIG. 14 is a flowchart of generating a task using a device control method in a network according to another embodiment of the present invention. The flowchart will now be described with reference to FIG. 4. It will be assumed that the first device 400_1 is a task generating device or a task generating and performing device, and the second device 400_2 is a task performing device.

A user selects a service using the first device 400_1 that has a UI function from among devices connected to the network 410 (Operation 1401), and the first device 400_1 generates the task according to the service (Operation 1402).

The first device 400_1 checks if the task is to be performed by the first device 400_1 (Operation 1403) as described with reference to the controller 502 illustrated in FIG. 5.

If the task is to be performed by the first device 400_1, the first device 400_1 performs the task (Operation 1404). The first device 400_1 updates information on the task (Operation 1405).

The first device 400_1 checks if there is another task to be performed by the first device 400_1 based on the updated information on the task (Operation 1406).

If there is another task to be performed by the first device 400_1 or the task is not to be performed by the first device 400_1, the first device 400_1 notifies another device of the generation of the task via the network 410 (Operation 1407).

Operations 1408 through 1411 are the same as Operations 1204 through 1207 illustrated in FIG. 12. Therefore, the flowchart of FIG. 14 can further comprise Operations 1308 and 1309 illustrated in FIG. 13.

The flowcharts illustrated in FIGS. 12 through 14 can further comprise an operation of the first device 400_1 that notifies the user that no response is received from another device if the first device 400_1 does not receive the command to browse or search for the task during a predetermined period of time after notifying another device of the generation of the task, or if the first device 400_1 does not receive the request to fetch the task during a predetermined period of time after receiving the command to browse or search for the task and transmitting the information on the task.

Figure 15:
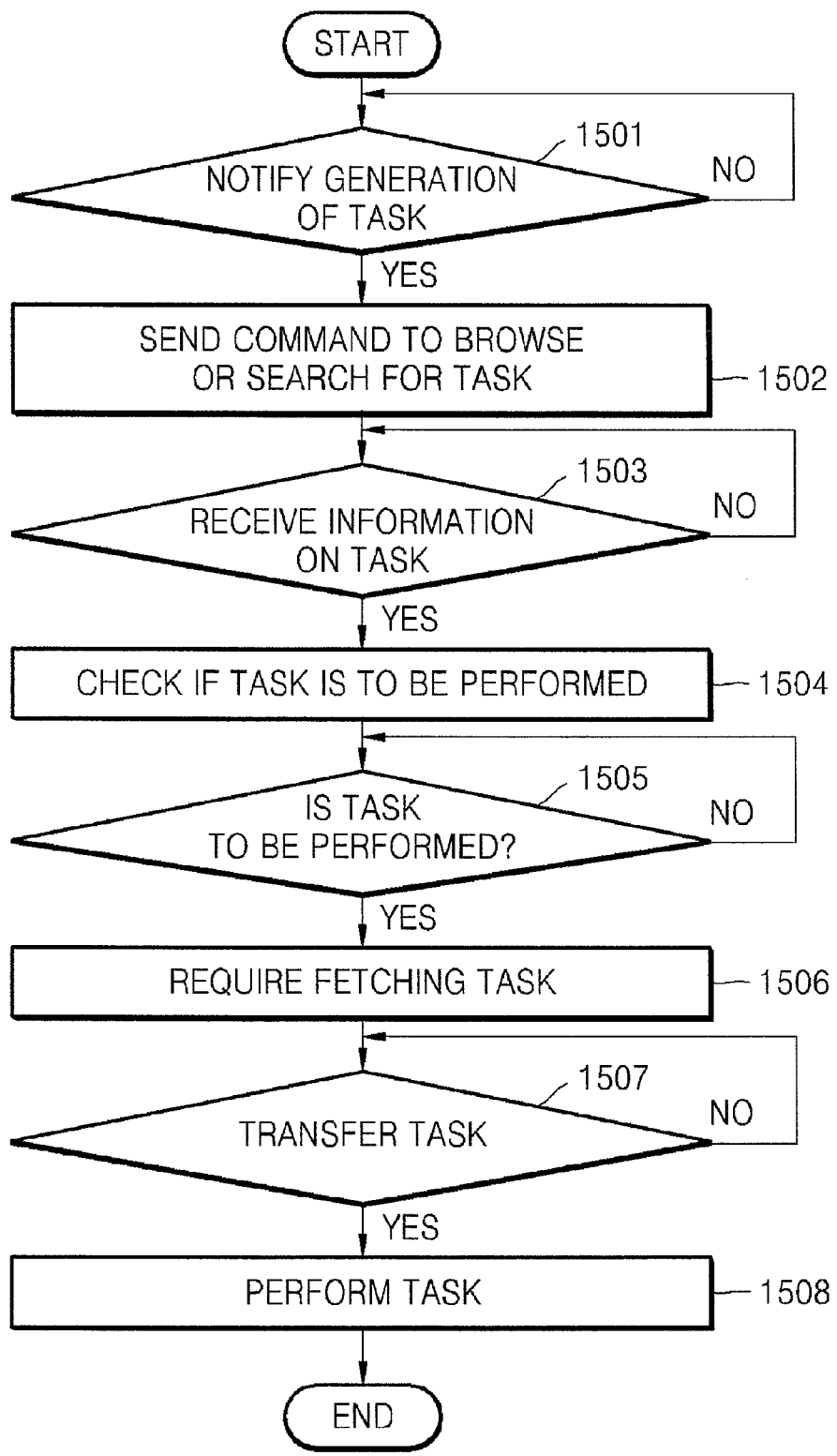
FIG. 15 is a flowchart of performing a task using a device control method in a network according to an embodiment of the present invention.

FIG. 15 is a flowchart of performing a task using a device control method in a network according to an embodiment of the present invention. The flowchart will now be described with reference to FIG. 4. The first device 400_1 is a task generating device, and the second device 400_2 is a task performing device.

The first device 400_1 connected to the network 410 notifies the second device 400_2 connected to the network 410 of the generation of the task (Operation 1501), the second device 400_2 sends a command to browse or search for the task to the first device 400_1 (Operation 1502).

The second device 400_2 receives information on the task from the first device 400_1, and checks if the task is to be performed by the second device 400_2 based on the information on the task (Operations 1503 and 1504).

If the task is to be performed by the second device 400_2, the second device 400_2 requests the first device 400_1 to fetch the task (Operation 1506). The second device 400_2 performs the task based on the information on the task (Operations 1507 and 1508).

Figure 16:
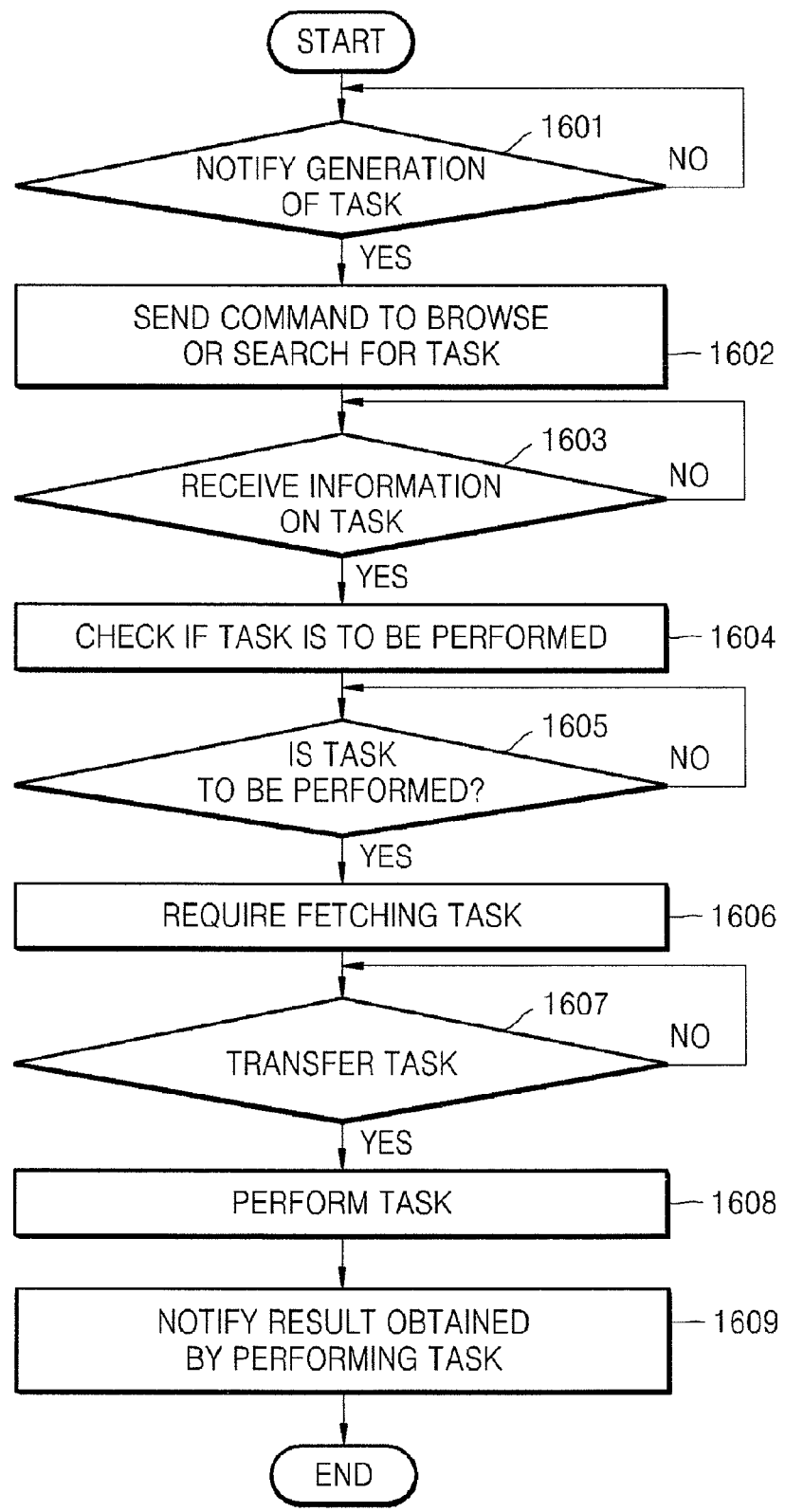
FIG. 16 is a flowchart of performing a task using a device control method in a network according to another embodiment of the present invention.

FIG. 16 is a flowchart of performing a task using a device control method in a network according to another embodiment of the present invention. Operations 1601 through 1608 illustrated in FIG. 16 are the same as Operations 1501 through 1508 illustrated in FIG. 15.

The second device 400_2 performs the task (Operation 1608), and notifies the first device 400_1 of a result obtained by performing the task via the network 410 (Operation 1609).

Figure 17:
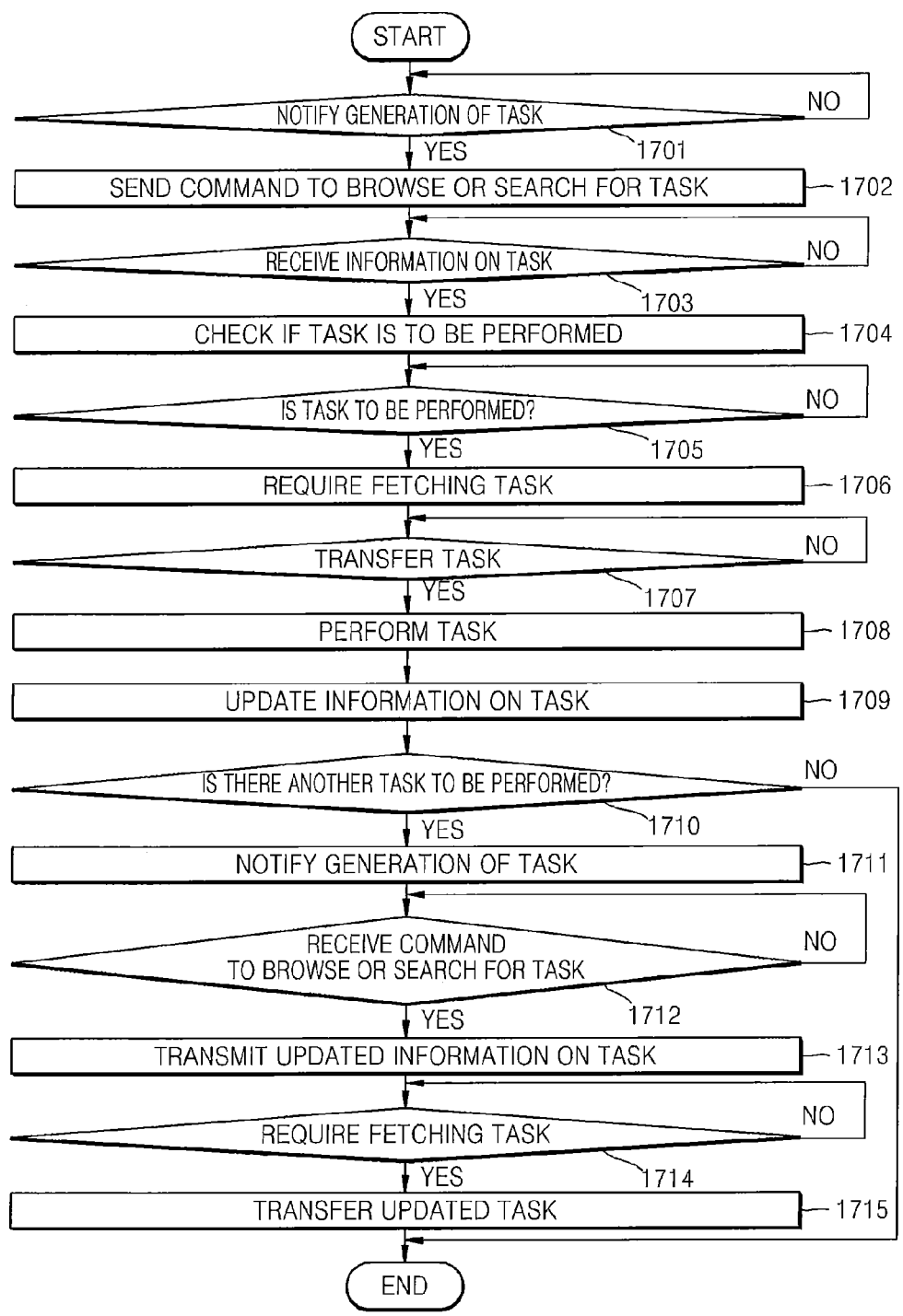
FIG. 17 is a flowchart of performing a task using a device control method in a network according to another embodiment of the present invention.

FIG. 17 is a flowchart of performing a task using a device control method in a network according to another embodiment of the present invention. Referring to FIG. 17, several devices are used to perform the task. The first device 400_1 is a task generating device, and the second device 400_2 and the third device 400_3 are task performing devices.

Operations 1701 through 1708 illustrated in FIG. 17 are the same as Operations 1501 through 1508 illustrated in FIG. 15.

The second device 400_2 performs the task (Operation 1708), and updates information on the task (Operation 1709). The second device 400_2 checks if there is another task to be performed by the second device 400_2 based on the updated information on the task (Operation 1710).

If there is another task to be performed by the second device 400_2, the second device 400_2 notifies another device of the generation of the task via the network 410 (Operation 1711). The second device 400_2 receives a command to browse or search for the task via the network 410 (Operation 1712), and transmits the updated information on the task to the third device 400_3 that sent the command to browse or search for the task (Operation 1713).

The second device 400_2 receives a request to fetch the task from the third device 400_3 via the network 410 (Operation 1714), and transfers the updated task to the third device 400_3 (Operation 1715). The updated information on the task is transferred to the third device 400_3 from the second device 400_2.

If the third device 400_3 is a last device to perform the task, the third device 400_3 performs the task and can notify the first device 400_1 of a result obtained by performing the task. Therefore, if there is no other device to be performed, the flowchart illustrated in FIG. 17 can further comprise an operation of the third device 400_3 that notifies the first device 400_1 of the result.

Figure 18:
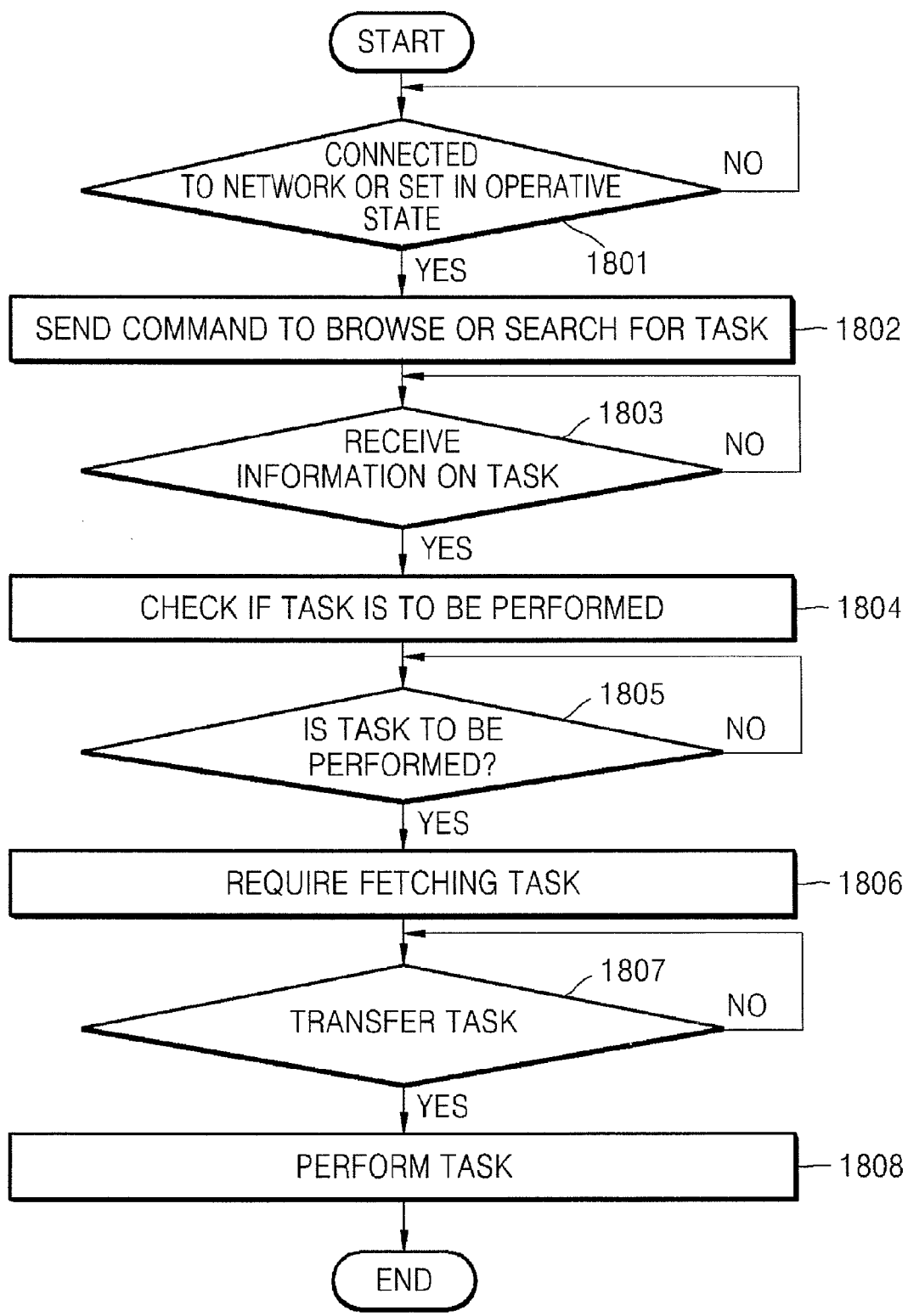
FIG. 18 is a flowchart of performing a task using a device control method in a network according to another embodiment of the present invention.

FIG. 18 is a flowchart of performing a task using a device control method in a network according to another embodiment of the present invention. Referring to FIG. 18, a task performing device is not connected to the network or is in a non-operative state while being connected to the network when the task is generated.

The flowchart illustrated in FIG. 18 will now be described with reference to FIG. 4. The first device 400_1 is a task generating device, and the second device 400_2 is a task performing device.

When the second device 400_2 is connected to the network 410 or is in an operative state, the second device 400_2 sends a command to browse or search for the task to another device connected to the network 410 (Operations 1801 and 1802).

The second device 400_2 receives information on the task from the first device 400_1 via the network 410, and checks if the task is to be performed by the second device 400_2 based on the information on the task (Operations 1803 and 1804).

If the task is to be performed by the second device 400_2, the second device 400_2 requests the first device 400_1 to fetch the task (Operations 1805 and 1806). The second device 400_2 receives the task from the first device 400_1, and performs the task (Operations 1807 and 1808.

The flowchart illustrated in FIG. 18 can further comprise an operation of the second device 400_2 that updates the information on the task, checks if there is another task to be performed by the second device 400_2 based on the updated information on the task, and if there is another task to be performed by the task, notifies another device of the generation of the task via the network 410, receives a command to browse or search for the task via the network 410, transmits the updated information on the task to the third device 400_3 that sent the command to browse or search for the task, receives a request to fetch the task from the third device 400_3 via the network 410, and transfers the updated task to the third device 400_3.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed network coupled computer systems so that the computer readable code is stored and executed in a distributed fashion.

According to the present invention, a device having a UI function in a home network using UPnP is used to generate a task according to a service desired by a user, and devices used to provide the service to the user voluntarily perform the task, thereby easily providing the service to the user without classifying a control point and Controlled devices in the home network and monitoring the devices performing the task.

Also, the devices voluntarily perform the task, thereby providing the service to the user without control information on the devices.

Also, the service can be provided to the user at an available time of the devices which are not connected to the home network or are in a non-operative state when the task is generated according to a user's service request, so that it is not necessary for the user to further request the service at the availability point-in-time of the devices.

Moreover, the device having the UI function is used to generate the task according to the service desired by the user and provide the service without classifying the control point and the Controlled devices, thereby providing the service to the user even if the control point is not connected to the home network.

While this invention has been particularly shown and described with reference to exemplary embodiments thereof, it will be understood by those skilled in the art that various changes in form and details may be made therein without departing from the spirit and scope of the invention as defined by the appended claims.

The invention claimed is:

1. A method for providing a service in a network by a first device, the method comprising:
    generating a task including a plurality of subtasks identified based on an order of actions necessary for performing the service;
    determining whether at least one subtask is to be performed by the first device;
    notifying the generation of the task to at least one device connected to the network based on the determination; and
    transferring the task to a second device in response to a request of the second device.

2. The method of claim 1, wherein the first device has a user interface (UI) function.

3. The method of claim 1, further comprising: if the first device receives a result obtained by performing the task from the second device, the first device notifying a user of the result.

4. The method of claim 1, further comprising: if the first device does not receive the request for the task during a predetermined period of time after the notifying the at least one device of the generation of the task, the first device notifying a user that no response is received from the at least one device.

5. The method of claim 1, wherein the plurality of subtasks are to be performed sequentially according to the order.

6. The method of claim 1, further comprising:
    selecting a subtask to be performed by the first device, among the plurality of subtasks and performing selected subtask,
    wherein the notifying comprises, notifying the updated task, to the at least one device, according to the performing of the selected subtask.

7. A method for providing a service in a network by a second device, the method comprising:
    receiving a notification about generating a task including a plurality of subtasks identified based on an order of actions necessary for performing the service from a first device;
    requesting a task when a first subtask included in the task is to be performed to the second device;
    receiving the task from the first device;
    performing the first subtask included in the received task;
    transmittin a notification about an updated task to at least one device connected to the network according to the performing of the first subtask; and
    transferring the updated task to a third device in response to a request of the third device which can perform second subtask included in the updated subtask,
    wherein the first subtask and the second subtask are identified based on order to be performed.

8. The method of claim 7, further comprising:
    the second deviceupdating the information on the task; and
    the second device determining whether there is another subtask to be performed.

9. The method of claim 7, wherein the plurality of sub asks are to be performed sequentially according to the order.

10. The method of claim 7, further comprising: after performing the first subtask, the second device notifying the first device of a result obtained by performing the task.

11. A task generating device for performing a task comprising:
- a user interface (UI) which interfaces a user and the task generating device;
- a storage unit which stores information on a task;
- a data transmitter and receiver which transmits and receives data via the network; and
- a controlling unit which, generates the task including a plurality of subtasks identified based on an order of actions necessary for performing a service, determines whether at least one subtask is to be performed by the task generatin device, notifies the generation of the task to at least one task performing device connected to the network based on the determination and transfers the task to the task performing device in response to request of a second device.

12. The task generating device of claim 11, wherein the plurality of subtasks are to be performed sequentially according to the order.

13. The task generating device of claim 11, wherein the controlling unit which selects the subtask to be performed by the task generating device, performs the selected subtask and notifies an updated task to the at least one task performing device according to the performing of the selected subtask.

14. The task generating device of claim 13, wherein if the controlling unit receives a result obtained by performing the first subtask from the task performing device via the data transmitter and the receiver, the controlling unit outputs the result to the UI.

15. A task performing device for providing a service in a network, comprising:
- a data transmitter and receiver which transmits and receives data via the network; and
- a controlling unit which, if the controlling unit receives a notice of generating a task including a plurality of subtasks identified based on an order of actions necessary for performing the service, from a task generating device, requests a task when a first subtask included in the task is to be performed to the task generating device, receives the task from the task generating device, performs the first subtask included in the received task and transmits a notification about an updated task to at least one task performing device connected to the network according to the performing of the first subtask and transfers the updated task to another task performing device in response to request of the other task performing device which can perform second subtask included in the updated subtask, wherein the first subtask and the second subtask are identified based on the order to be performed.

16. The system of claim 15, further comprising: a storage unit which, if the controlling unit updates the information on the task after performing the task, stores the updated information on the task.

17. The system of claim 16, wherein if there is another task to be performed by the controlling unit based on the updated information on the task stored in the storage unit, the controlling unit transmits a message notifying of the generation of the task to the data transmitter and receiver, and sends the updated task via the data transmitter and receiver.

18. A non-transitory computer readable recording medium having embodied thereon a computer program for executing a method for providing a service in a network by a first device, the method comprising:
- generating a task including a plurality of subtasks identified based on an order of actions necessary for performing the service;
- determining whether at least one subtask is to be performed by the first device;
- notifying the generation of the task to at least one device connected to the network based on the determination; and
- transferring the task to second device in response to request of the second device.

19. A non-transitory computer readable recording medium having embodied thereon a computer program for executing a method for providing a service in a network by a first device, the recording medium comprising:
- receiving a notification about generating a task including a plurality of subtasks identified based on an order of actions necessary for performing the service from afirst device;
- requesting a task, when a first subtask included in the task is to be performed, to the first device;
- receiving the task from the first device;
- performing the first subtask included in the received task;
- transmitting a notification about updated task to at least one device connected to the network according to the performing of the first subtask and
- transferring the updated task to third device in response to request of the third device which can perform second subtask included in the updated subtask, wherein the first subtask and the second subtask is identified based on the order to be performed.

* * * * *